(12) United States Patent
Nguessan (10) Patent No.: US 11,762,526 B2
(45) Date of Patent: *Sep. 19, 2023

(54) AUTOMATIC FOCUS DETECTION WITH RELATIVE THRESHOLD-AWARE CELL VISIBILITY FOR A SCROLLING CELL COLLECTION

(71) Applicant: Google LLC, Mountain View, CA (US)

(72) Inventor: Olayinka Sylvia Nguessan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,773

(22) Filed: Mar. 7, 2022

(65) Prior Publication Data

US 2022/0187980 A1 Jun. 16, 2022

Related U.S. Application Data

(63) Continuation of application No. 16/732,024, filed on Dec. 31, 2019, now Pat. No. 11,269,479.

(51) Int. Cl.
*G06F 17/00* (2019.01)
*G06F 3/04812* (2022.01)
(Continued)

(52) U.S. Cl.
CPC ...... *G06F 3/04812* (2013.01); *G06F 3/04842* (2013.01); *G06F 3/04855* (2013.01);
(Continued)

(58) Field of Classification Search
CPC ............. G06F 3/04812; G06F 3/04842; G06F 3/04855; G06F 3/04886; G06F 3/0485; G06F 2203/04804; G06F 40/18
See application file for complete search history.

(56) References Cited

U.S. PATENT DOCUMENTS 6,857,128 B1 2/2005 Borden, IV et al.
7,796,142 B2 9/2010 Villers
(Continued)

FOREIGN PATENT DOCUMENTS

| CN | 110582012 A | 12/2019 |
| CN | 110583012 A | 12/2019 |
| WO | 2018/236451 A1 | 12/2018 |

OTHER PUBLICATIONS

PCT International Search Report and Written Opinion for International Application No. PCT/US2020/053647, dated Jan. 22, 2021, 13 pages.
(Continued)

*Primary Examiner* — Laurie A Ries
(74) *Attorney, Agent, or Firm* — Lowenstein Sandler LLP (57) ABSTRACT

A system and methods are disclosed for automatic focus detection with relative threshold-aware cell visibility for a scrolling cell collection. The method includes identifying a visible portion of a graphical user interface (GUI), wherein the visible portion of the GUI includes a plurality of cells, and determining a plurality of distance values, wherein each distance value of the plurality of distances values indicates a distance to a focus threshold in the GUI that a cell of the plurality of cells of the visible portion of the GUI has traveled since the visible portion became visible in the GUI, wherein the distance value comprises a relative threshold visibility value. The method further includes modifying a behavior of the visible portion of the GUI based on the distance value of each of the plurality of cells.

20 Claims, 6 Drawing Sheets

(51) Int. Cl.
*G06F 40/18* (2020.01)
*G06F 3/04842* (2022.01)
*G06F 3/04855* (2022.01)
*G06F 3/04886* (2022.01)

(52) U.S. Cl.
CPC .......... *G06F 3/04886* (2013.01); *G06F 40/18* (2020.01); *G06F 2203/04804* (2013.01)

(56) References Cited

U.S. PATENT DOCUMENTS

| | | | |
|---|---|---|---|
| 8,046,705 B2* | 10/2011 | Hunleth | G06F 16/40 |
| | | | 715/810 |
| 10,346,019 B2 | 7/2019 | Migos et al. | |
| 10,567,829 B2 | 2/2020 | Kleinerman et al. | |
| 10,706,119 B1 | 7/2020 | Yellin et al. | |
| 10,782,852 B1* | 9/2020 | Al Majid | H04L 51/10 |
| 10,783,548 B1* | 9/2020 | Bhowmick | G06Q 30/0242 |
| 11,483,613 B2 | 10/2022 | Kleinerman et al. | |
| 2003/0020671 A1 | 1/2003 | Santoro et al. | |
| 2005/0270305 A1 | 12/2005 | Rasmussen et al. | |
| 2008/0082472 A1* | 4/2008 | Dalton | G06T 17/05 |
| | | | 706/45 |
| 2010/0125804 A1* | 5/2010 | O'Dea | G06F 3/04812 |
| | | | 715/767 |
| 2010/0153544 A1 | 6/2010 | Krassner et al. | |
| 2012/0159393 A1 | 6/2012 | Sethi | |
| 2013/0097521 A1 | 4/2013 | Lewin et al. | |
| 2013/0125066 A1* | 5/2013 | Klein | G06F 3/04812 |
| | | | 715/862 |
| 2013/0238724 A1 | 9/2013 | Cunningham | |
| 2014/0201673 A1 | 7/2014 | Dunn | |
| 2014/0229268 A1* | 8/2014 | Clapp | G06Q 30/0242 |
| | | | 705/14.41 |
| 2015/0113483 A1 | 4/2015 | Van Der Westhuizen et al. | |
| 2016/0065505 A1 | 3/2016 | Iskander | |
| 2016/0321230 A1* | 11/2016 | Wang | G06F 3/04855 |
| 2016/0328755 A1 | 11/2016 | Uchida et al. | |
| 2016/0357398 A1* | 12/2016 | Frem | G06F 3/0481 |
| 2018/0165793 A1* | 6/2018 | Jeon | G06T 3/40 |
| 2018/0300032 A1 | 10/2018 | Gil | |
| 2018/0348983 A1 | 12/2018 | Tanabe | |
| 2018/0367840 A1 | 12/2018 | Kleinerman et al. | |
| 2019/0265797 A1 | 8/2019 | Chaudhri et al. | |
| 2019/0302994 A1 | 10/2019 | Boshoff et al. | |
| 2019/0377487 A1 | 12/2019 | Bailey et al. | |
| 2020/0186866 A1 | 6/2020 | Kleinerman et al. | |
| 2021/0150449 A1* | 5/2021 | Mann | G06Q 10/063114 |
| 2021/0166339 A1 | 6/2021 | Mann et al. | |

OTHER PUBLICATIONS

Chinese Office Action and Search Report for Application No. 202080048036.0, dated Sep. 30, 2022, in English and Chinese, 14 pages.

Indian Office Action for Application No. 202147061244, dated Aug. 3, 2022, 5 pages.

* cited by examiner

AUTOMATIC FOCUS DETECTION WITH RELATIVE THRESHOLD-AWARE CELL VISIBILITY FOR A SCROLLING CELL COLLECTION

CROSS-REFERENCE TO RELATED APPLICATION

This continuation application claims priority to U.S. patent application Ser. No. 16/732,024, filed on Dec. 31, 2019, which is incorporated herein by reference.

TECHNICAL FIELD

Aspects and implementations of the disclosure relate to display processing, and more specifically, to automatic focus detection with relative threshold-aware cell visibility for a scrolling cell collection.

BACKGROUND

Media viewer applications enable users to view content, such as images, videos, web pages, documents, etc. For example, the media viewer may be a web browser that can access, retrieve, present, and/or navigate content (e.g., web pages such as Hyper Text Markup Language (HTML) pages, digital media items or content items, etc.) served by a web server. The media viewer may render, display, and/or present the content (e.g., a web page, a document) to a user. The media viewer may also display an embedded media player (e.g., a Flash® player or an HTML5 player) that is embedded in a web page (e.g., a web page that may provide information about a product sold by an online merchant). In another example, the media viewer may be a standalone application (e.g., a mobile application) that allows users to view digital media content items (e.g., digital videos, digital images, electronic books, etc.).

Media viewers may provide a graphical user interface (GUI) to display received content (e.g., a document, page, etc.). The size of the content may exceed the space available for display on the GUI. In this case, the GUI only displays a portion of the content. The content itself can be divided into one or more cells that may scroll vertically or horizontally for display in the GUI. The cells may be a rectangular array of pixel values within the content being rendered in the GUI. The cells can represent different logical portions and/or graphical elements of the content being rendered. For example, a cell may represent a video player portion of content being rendered, an advertisement section of the content, an item within a feed or activity section of the content, and so on.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the disclosure, a system and methods are disclosed for automatic focus detection with relative threshold-aware cell visibility for a scrolling cell collection. In one implementation, a method includes identifying visible cells of a plurality of cells of a reference frame, the visible cells rendered in a graphical user interface (GUI) displaying at least a portion of the reference frame, determining, by a processing device rendering the GUI and for each visible cell of the visible cells, a distance value indicating a distance to a focus threshold in the reference frame that the visible cell has traveled since the visible cell became visible in the GUI, and modifying a behavior of the visible cells in the GUI based on the distance value of each of the visible cells.

In one implementation, the focus threshold indicates a location in the reference frame that the visible cell becomes a focus cell in the GUI. In some implementations, the distance value includes a relative threshold visibility percentage. Furthermore, determining the relative threshold visibility percentage may include identifying an unselected visible cell of the visible cells in a visible window of the reference frame, determining a threshold cutoff point for the unselected visible cell, determining a first distance between a window edge of the visible window and the threshold cutoff point, determining a second distance between a cell edge of the unselected visible cell and the threshold cutoff point, and determining the relative threshold visibility percentage of the unselected visible cell based on the first distance and the second distance.

In one implementations, the focus cells include the visible cells most likely to be focused on in the GUI, and a different cell behavior is applied to the visible cells in response to identification as one of the focus cells. In addition, the visible cells may include one or more cells of the reference frame having at least one pixel rendered in the GUI. In some implementations, the GUI corresponds to a visible window within a scrolling container of the reference frame, where the scrolling container includes a set of the plurality of cells that can scroll at least one of horizontally or vertically within the scrolling container, and where at least a portion of the visible cells are in the visible window.

In some implementations, the plurality of cells each include a rectangular array of pixels of the reference frame corresponding to logically separate sections of the reference frame. Furthermore, the method may further include identifying the visible cells that have an absolute visibility percentage that exceeds a threshold visibility percentage, selecting a determined number of the identified visible cells as focus cells based on a number of the focus cells designated for the GUI, ordering the identified visible cells into ordered visible cells according to a priority sort order, selecting the determined number of the ordered visible cells that are ordered highest as the focus cells; and returning identification of the focus cells and the distance values of each of the visible cells. In one implementation, the priority sort order is based on at least one of a top-to-bottom direction, a bottom-to-top direction, a left-to-right direction, or a right-to-left direction.

In some implementations, modifying the behavior includes applying the distance value to the visible cells to provide a color blending effect in the visible cells in accordance with a particular value of the distance value. Furthermore, modifying the behavior may include performing data prefetching of the visible cells based on the distance value of the visible cells. In one implementation, the distance value is provided to a server device for data logging corresponding to the visible cells.

Further, computing devices for performing the operations of the above described methods and the various implementations described herein are disclosed. Computer-readable media that store instructions for performing operations associated with the above described methods and the various implementations described herein are also disclosed.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Media viewer applications enable users to view content, such as images, videos, web pages, documents, etc. For example, the media viewer may be a web browser that can access, retrieve, present, and/or navigate content (e.g., web pages such as HyperText Markup Language (HTML) pages, digital media items or content items, etc.) served by a web server. The media viewers may render, display, and/or present the content (e.g., a web page, a document) to a user. The media viewer may also display an embedded media player (e.g., a Flash® player or an HTML5 player) that is embedded in a web page (e.g., a web page that may provide information about a product sold by an online merchant). In another example, the media viewer may be a standalone application (e.g., a mobile application) that allows users to view digital media content items (e.g., digital videos, digital images, electronic books, etc.).

Media viewers may provide a graphical user interface (GUI) to display received content (e.g., document, page (e.g., HyperText Markup Language (HTML) page), etc.). The size of the content may exceed the space available for display on the GUI. When the content exceeds the space available for display, the GUI displays a portion (or subset) of the content at any given point in time. The content can be represented as a reference frame. The reference frame may be the collection of data representing the received content to be rendered. The portion of the content displayed in the GUI can be represented as a visible window that scrolls horizontally or vertically within the reference frame.

The reference frame can be divided into one or more cells that may scroll vertically or horizontally for display in the GUI. The cells may be a rectangular array of pixels within the content. The cells can represent different logical portions and/or graphical elements of the content. For example, a cell may represent a video player portion of content being rendered, an advertisement section of the content, an item within a feed or activity section of the content, and so on.

In conventional systems, media viewers may provide a particular or specialized treatment (e.g., automatic play of a video, color treatment, etc.) to cells based on visibility of the cells in the GUI. A cell may be considered a visible cell when at least one pixel corresponding to the cell is rendered in the GUI. One or more of the visible cells in a GUI may be selected as focus cells. The focus cells are the visible cells most likely to be focused on (e.g., by a user) within the GUI. However, conventional systems that select focus cells typically do not provide information regarding the other visible cells in the GUI that are not selected as focus cells ("unselected visible cells"). In conventional systems, information is not provided with respect to unselected visible cells that indicates how close such cells are to becoming a focus cell.

Implementations of the disclosure provide for determination of a distance value of visible cells in a reference frame corresponding to content to be rendered. The distance value may be a relative threshold visibility percentage that can serve as an objective indicator to determine how close an unselected visible cell is to becoming a focus cell. In implementations of the disclosure, the relative threshold visibility percentage refers to a proportion of a distance to a focus threshold that a visible cell has traveled (in the reference frame) since the visible cell became visible in a visible window (e.g., GUI) of the reference frame. In one implementation, the focus threshold refers to a location in the reference frame where the visible cell will be selected as a focus cell in the GUI.

The relative threshold visibility percentage provided by implementations of the disclosure allows for better control and/or monitoring of unselected visible cells. For example, data regarding relative threshold visibility percentage for unselected visible cells may support features including, but not limited to, visibility threshold-aware animation (e.g., color blending application based on relative threshold visibility percentage of a cell), data prefetching (e.g., starting a pre-fetching mechanism based on relative threshold visibility percentage of a cell), or improving attention logging at a server device for the cells (e.g., relative threshold visible percentage provides information on how close a cell is to being a focus cell).

Aspects of the disclosure thus provide a mechanism by which additional focus-based information is determined for all visible cells of a reference frame of content being rendered in a GUI. In particular, aspects of the disclosure provide for determination of a relative threshold visibility percentages for the visible cells in the reference frame. As noted above, this mechanism allows for better control and monitoring of the unselected visible cells in a reference frame. An advantage of implementations of the disclosure is improved support for features affecting the behavior of the unselected visible cells, such as visibility threshold aware animation, data prefetching, and improved detailed logging data with respect to the visible cells. This improved support can then be utilized to optimize the user experience with respect to the GUI provided in implementations of the disclosure.

Figure 1:
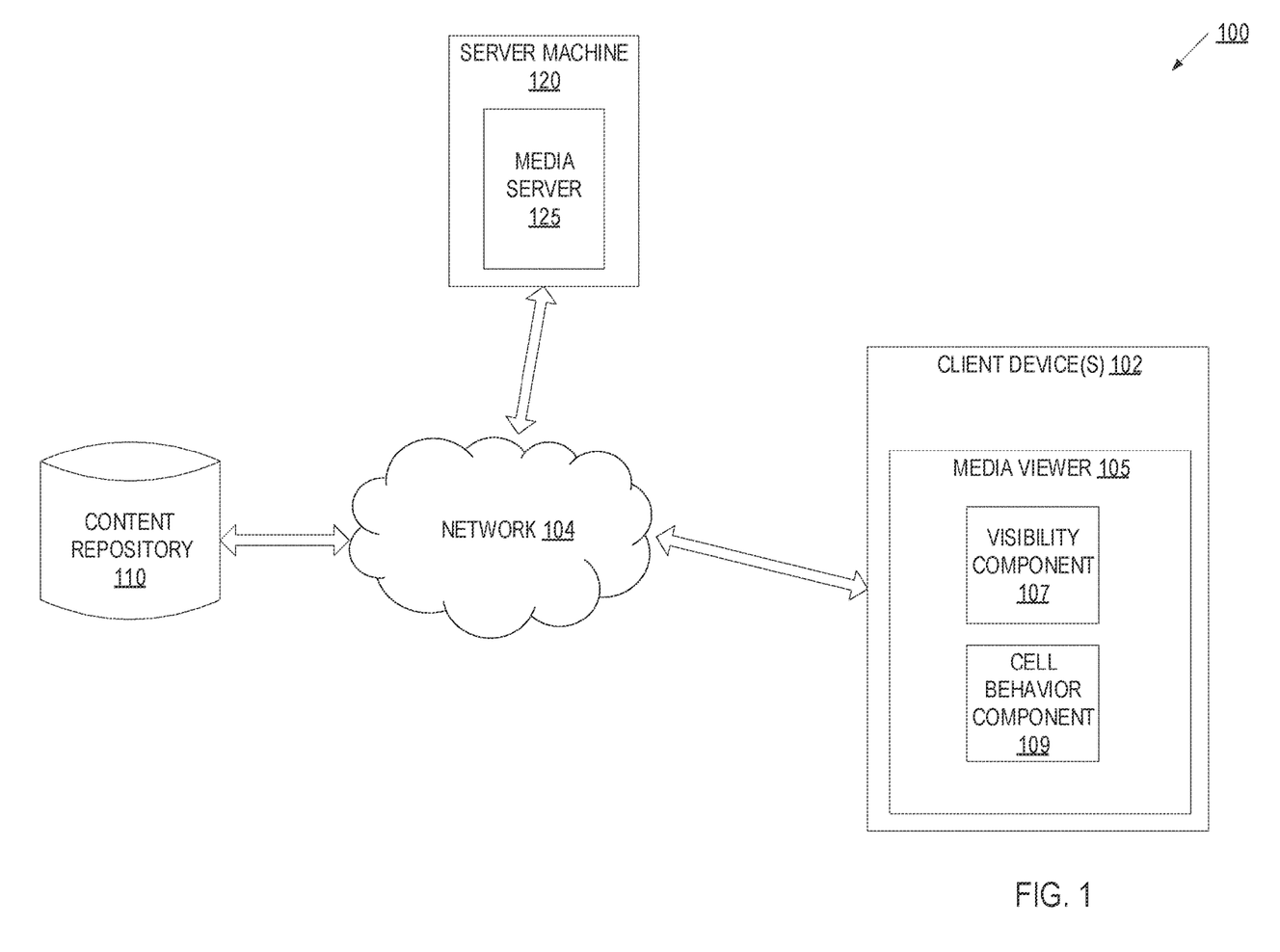
FIG. 1 depicts an illustrative computer system architecture, in accordance with one or more aspects of the disclosure.

FIG. 1 illustrates an illustrative system architecture 100, in accordance with one implementation of the disclosure. The system architecture 100 includes one or more server machines (e.g., example server machine 120 is depicted), a content repository 110, and client machines (e.g., example client device 102 is depicted) connected to a network 104.

Network 104 may be a public network (e.g., the Internet), a private network (e.g., a local area network (LAN) or wide area network (WAN)), or a combination thereof.

The client device 102 may be personal computer (PC), laptop, mobile phone, tablet computer, set top box, television, video game console, digital assistant, or any other computing device. The client device 102 may run an operating system (OS) that manages hardware and software of the client device 102. In one implementation, the client device 102 may upload videos to the web server (such as media server 125 discussed below) for storage and/or processing.

Server machine 120 may be a rackmount server, a router computer, a personal computer, a portable digital assistant, a mobile phone, a laptop computer, a tablet computer, a camera, a video camera, a netbook, a desktop computer, a media center, or any combination of the above. Server machine 120 includes a media server 125 that is capable of receiving and serving content (e.g., videos, audio clips, images, etc.) uploaded by client machines, such as client device 102 (e.g., via a webpage, via an application, etc.).

Content repository 110 is a persistent storage that is capable of storing content items as well as data structures to tag, organize, and index the media items. Content repository 110 may be hosted by one or more storage devices, such as main memory, magnetic or optical storage based disks, tapes or hard drives, NAS, SAN, and so forth. In some implementations, content repository 110 may be a network-attached file server, while in other embodiments content repository 110 may be some other type of persistent storage such as an object-oriented database, a relational database, and so forth, that may be hosted by the server machine 120 or one or more different machines coupled to the server machine 120 via the network 104.

The content items stored in the content repository 110 may include user-generated media items that are uploaded by client machines, as well as media items from service providers such as news organizations, publishers, libraries and so forth. In some implementations, content repository 110 may be provided by a third-party service, while in some other implementations content repository 110 may be maintained by the same entity maintaining server machine 120. In some examples, content repository 110 and server machine 120 may be part of a content sharing platform that allows users to upload, consume, search for, approve of ("like"), dislike, and/or comment on media items.

The content sharing platform may include multiple channels. A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Each channel may include one or more media items. Examples of media items can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media items are also referred to as a video content item.

Media items may be consumed via media viewer 105 executing on client device 102. In one implementation, the media viewer 105 may be an application that allows users to view content, such as images, videos (e.g., video content items), web pages, documents, etc. For example, the media viewer 105 may be a web browser that can access, retrieve, present, and/or navigate content (e.g., web pages such as Hyper Text Markup Language (HTML) pages, digital media items or content items, etc.) served by a web server. The media viewer 105 may render, display, and/or present the content (e.g., a web page, a media viewer) to a user. The media viewer 105 may also display an embedded media player (e.g., a Flash® player or an HTML5 player) that is embedded in a web page (e.g., a web page that may provide information about a product sold by an online merchant). In another example, the media viewer 105 may be a standalone application (e.g., a mobile application) that allows users to view digital media content items (e.g., digital videos, digital images, electronic books, etc.).

The media viewer 105 may be provided to the client device 102 by the server 120 and/or content sharing platform. For example, the media viewer 105 may be embedded media players that are embedded in web pages provided by the content sharing platform. In another example, the media viewer 105 may be an applications that communicates with the server 120 and/or the content sharing platform.

Implementations of the disclosure provide for automatic focus detection with relative threshold-aware cell visibility for a scrolling cell collection. In one implementation, media viewer 105 includes a visibility component 107 to provide for automatic focus detection with relative threshold-aware cell visibility for a scrolling cell collection. As noted above, the media viewer 105 can provide a GUI to display received content, such as a document or a page to be rendered in the GUI. In one implementation, the received content may include one or more content items from the media server 125.

In some implementations, the size of the received content to be rendered at the client device 102 may exceed the space available for display on a GUI provided by the client. In this case, the GUI displays a portion of the content at any given time. The received content for rendering by the GUI may be represented as a reference frame The reference frame can be divided into one or more cells that may scroll vertically or horizontally for display in the GUI (i.e., a scrolling cell collection (SCC)). The cells may each be a rectangular array of pixel values within the content being rendered in the GUI. The cells within a reference frame can vary in size and can be non-uniform. As noted above, the cells can represent different logical portions and/or graphical elements of the content being rendered. For example, a cell may represent a video player portion of content being rendered, an advertisement section of the content, an item within a feed or activity section of the content, and so on.

The content to be displayed in the GUI provided by the media viewer 105 at a particular point in time may correspond to a visible window within a scrolling container of the reference frame. The scrolling container comprises a set of the plurality of cells of the reference frame that can scroll horizontally or vertically within the scrolling container. The cells of the plurality of cells that are visible in the visible window are referred to as visible cells. Visible cells in the visible window include any cells of the reference frame having at least one pixel rendered in the GUI (e.g., visible window). For purposes of the discussion herein, the terms GUI and the visible window may be used interchangeably.

In some implementations, the media viewer 105 may apply a specialized treatment (e.g., automatic play of a video, color treatment, etc.) to cells in a reference frame based on visibility of the cells in the visible window rendered in the GUI. In particular, one or more visible cells in a GUI may be considered focus cells. The focus cells may refer to the visible cells most likely to be focused on (e.g., by a user) in the GUI. However, as previously noted, conventional system for selecting focus cells do not provide information regarding the cells in the visible window that are not selected as focus cells (referred to herein as unselected visible cells). For example, in conventional systems, information was not provided with respect to unselected visible cells that indicated how close such cells were to becoming a focus cell.

Implementations of the disclosure provide for determination of a distance value (e.g., relative threshold visibility percentage) of visible cells in a reference frames. The distance value (e.g., relative threshold visibility percentage) serves as an objective indicator to determine how close an unselected visible cell is to becoming a focus cell. In one implementation, the visibility component 107 of media viewer 105 of client device 102 determines the relative threshold visibility percentage. In some implementations, the visibility component 107 may determine the relative threshold visibility at every frame refresh of the GUI (e.g., in accordance with the frame refresh rate of the GUI). The visibility component 107 may determine the relative threshold visibility percentage at other time intervals as well in accordance with implementations of the disclosure.

The relative threshold visibility percentage provided by implementations of the disclosure allows for better control and/or monitoring of unselected visible cell behavior. For example, data regarding relative threshold visibility percentage for unselected visible cells may support features including, but not limited to visibility threshold aware animation (e.g., color blending application to the unselected visible cells), data prefetching (e.g., start a pre-fetching mechanism using relative threshold visibility percentage of an unselected visible cell), or improving attention logging at a server device for the unselected visible cells. In one implementation, the cell behavior component 109 of media viewer 105 may receive the relative threshold visibility percentage data for visible cells of a reference frame (rendered in a GUI of the media viewer 105) and cause a particular cell behavior feature (e.g., color blending, data prefetching, etc.) to be applied to the unselected visible cells according to the particular associated relative threshold visibility percentage of the cells.

Specifically, in one example of the color blending application, the cell behavior component 109 apply a red color to a focus cell while applying a yellow color to unselected visible cells in a reference frame. The particular intensity value of the yellow color to apply to an unselected visible cell may be determined by the cell behavior component 109 using the relative threshold visibility percentage for the unselected visible cell, where the yellow color is blended with increasing hues of the red color as the relative threshold visibility percentage approaches 100%. As such, the relative threshold visibility percentage for the unselected visible cell may be used by the cell behavior component 109 to calculate the specific intensity values of yellow and/or red to apply to the unselected visible cell.

In another example of a data prefetching use for relative threshold visibility percentage, the cell behavior component 109 may begin data prefetching for content in an unselected visible cell in response to the relative threshold visibility percentage for the unselected visible cell exceeding a determined threshold value. Similarly, the cell behavior component 109 may perform data prefetching for content in an unselected visible cell in accordance with the relative threshold visibility percentage of the unselected visible cell, so that if the relative threshold visibility percentage for the cell is 10%, the amount of prefetching content for the cell is also 10%, and so on.

In implementations of the disclosure, the relative threshold visibility percentage refers to a proportion of a distance to a focus threshold that a visible cell has traveled since the visible cell became visible in the GUI. In one implementation, the focus threshold indicates a location in the reference frame that the visible cell is to become a focus cell in the GUI.

The following discussion provides further explanation of determination of the relative threshold visibility percentage for cells in a reference frame by a visibility component 107 of a media viewer 105. In one implementation, received content at the media viewer 105 may be represented as a scrolling cell collection (SCC). The SCC is a rectangular container with a finite or infinite number of consecutive rectangular cells (C0, C1, C2 . . . ) that can scroll horizontally or vertically within the SCC. WSCC and HSCC are, respectively, the width and the height of the SCC. The SCC is also characterized by a rectangular area (the visible window) that it encloses. WSCC_Visible_Window and HSCC_Visible_Window are, respectively, the width and the height of the visible window of the SCC. If the SCC scrolls vertically, WSCC_Visible_Window>0 and HSCC>=HSCC_Visible_Window>0. If the SCC scrolls horizontally, HSCC_Visible_Window>0 and WSCC>=WSCC_Visible_Window>0. At any given time, because the SCC has a scrolling mechanism, a subset of its cells can be fully visible or partially visible within that visible window, and are referred to as visible cells.

Each one of those visible cells may have absolute vertical and horizontal visibility percentages, which indicate the percentage of their width and height that is visible within the visible window. Every cell contained in the SCC has threshold vertical and horizontal visibility percentages, which can be arbitrarily, subjectively, or objectively set (e.g., by an interface designer). The threshold vertical and horizontal visibility percentages represent the minimum limit for a cell to be considered fully visible in the visible window. In one implementation, a cell is considered partially visible when at least one pixel of the cell is rendered in the visible window. The cell may remain partially visible until its absolute visibility percentage exceeds the threshold visibility percentage of the cell.

Given an SCC cell, Cx, the Absolute_Visibility_Percentage_Vertical_Cx and Absolute_Visibility_Percentage_Horizontal_Cx are respectively the cell Cx's computed absolute vertical and horizontal visibility percentages. Furthermore, Threshold_Visibility_Percentage_Vertical_Cx and Threshold_Visibility_Percentage_Horizontal_Cx are respectively the cell Cx's given threshold vertical and horizontal visibility percentages. Lastly, Relative_Threshold_Visibility_Percentage_Vertical_Cx and Relative_Threshold_Visibility_P- ercentage_Horizontal_Cx are respectively the cell Cx's vertical and horizontal relative threshold visibility percentages computed according to the implementations of the disclosure described herein. The discussion with respect to FIG. 2 below provides further discussion of a process for determining the relative threshold visibility percentages.

Implementations of the disclosure may perform a selection process that determines which cell should be a focus cell (also referred to as "on focus" or "selected") within a visible window. Criteria used to make the focus cell determination for a cell includes, at given time:

1. an SCC;
2. SCC visible window;
3. SCC visible cells;
   i. each of which was given (arbitrarily) a:
      Threshold_Visibility_Percentage_Vertical_Cx,
      Threshold_Visibility_Percentage_horizontal_Cx;
   ii. for each of which is computed an:
      Absolute_Visibility_Percentage_Vertical_Cx,
      Absolute_Visibility_Percentage_horizontal_Cx;
4. a priority sort order (also referred to as sort order) (i.e., top-to-bottom or bottom-to-top (for vertically scrolling SCC), leftmost-to-rightmost or rightmost-to-leftmost (for horizontal scrolling SCC); and
5. a maximum number of visible cells to select as focus cells (max_number_selection), which can be arbitrarily set (max_number_selection>1).

Provided the input criteria above, implementations of the disclosure may perform a process to determine, for each visible cell, the Relative_Threshold_Visibility_Percentage_Vertical_Cx and the Relative_Threshold_Visibility_Percentage_horizontal_Cx. For a vertically-scrolling SCC, implementations of the disclosure may select, among the visible cells, the cells whose Absolute_Visibility_Percentage_Vertical_Cx>Threshold_Visibility_Percentage_Vertical_Cx. Similarly, for a horizontally-scrolling SCC, implementations of the disclosure may select, among the visible cells, the cells whose Absolute_Visibility_Percentage_horizontal_Cx>Threshold_Visibility_Percentage_horizontal_Cx.

Subsequently, from the selected cells above, implementations of the disclosure may select the top max_number_selection visible cells according to the sort order. As noted above, the sort order (also referred to herein as priority sort order) is based on at least one of a top-to-bottom direction, a bottom-to-top direction, a left-to-right direction, or a right-to-left direction. In one implementation, such sort order may be based on the typical reading direction of a set of users (e.g., typical reading direction from left-to-right or typical reading direction from left-to-right). Implementations of the disclosure may output the "selected" or "focused cells," as well as the relative threshold visibility percentages determined for each of the visible cells.

Accordingly, implementations of the disclosure can facilitate visibility percentage aware scroll processing by, for example, cell behavior component 109. For example, animations within a software SCC (collection view on any device with a screen) may be supported where cells can adjust their behavior based on, not only if the cells have been selected as focus cells, but also based on the cells relative threshold visibility percentages. Implementations of the disclosure may also be utilized in such a way that the "focus" or "selection" criteria can be personalized to a given viewer of the SCC.

In general, functions described in one implementation as being performed by the content item sharing platform and server machine 120 can also be performed on the client device device 102 in other implementations, if appropriate. In addition, the functionality attributed to a particular component can be performed by different or multiple components operating together. The content sharing platform and/or server machine 120 can also be accessed as a service provided to other systems or devices through appropriate application programming interfaces, and thus is not limited to use in websites.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
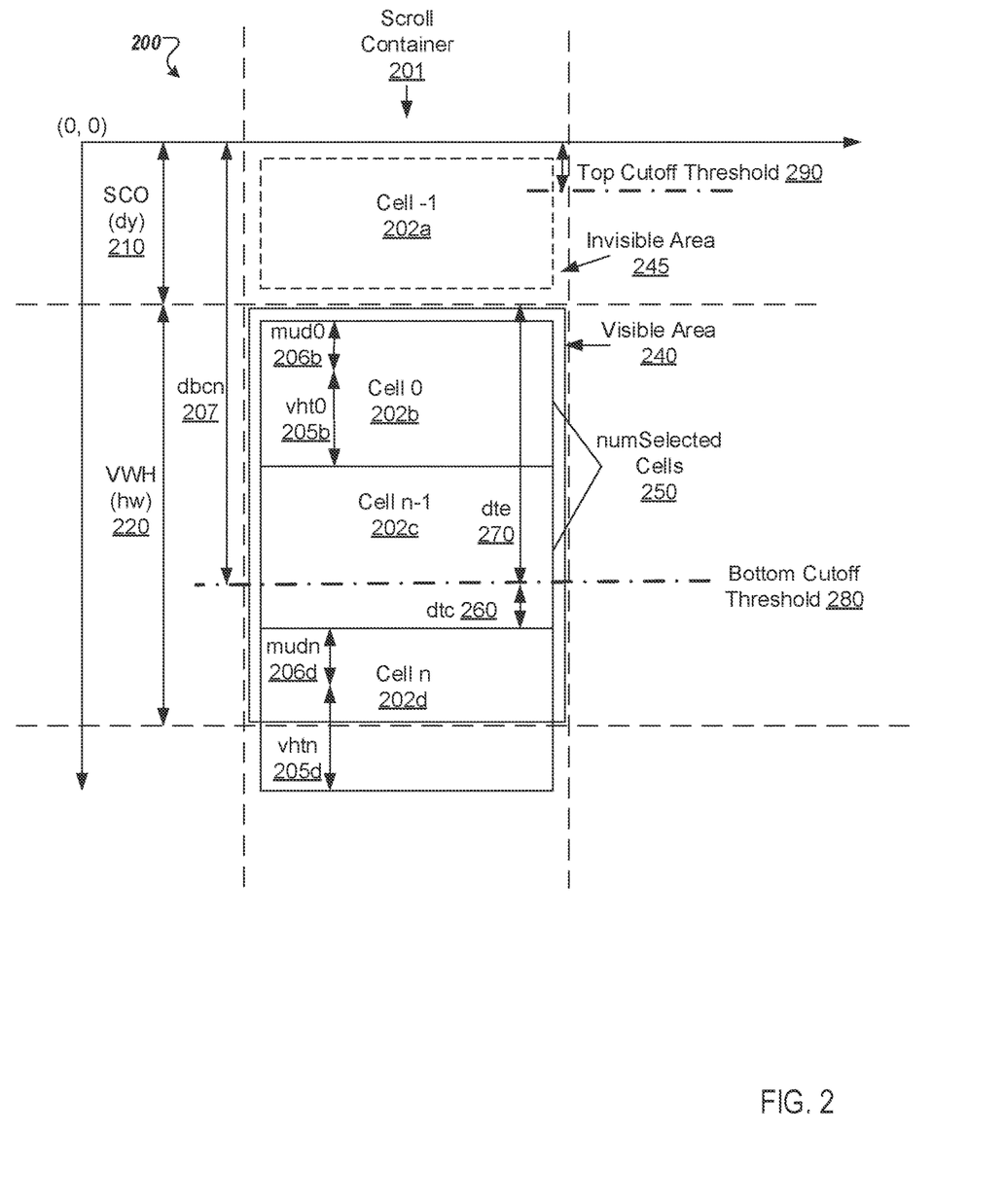
FIG. 2 is an example reference frame depicting a vertically scrolling scroll container used to determine relative threshold-aware visibility for a cell of the reference frame, in accordance with implementations of the disclosure.

FIG. 2 illustrates an example reference frame 200 depicting a vertically scrolling scroll container positioned in the reference frame that is used to determine relative threshold-aware visibility for a cell of the reference frame, in accordance with implementations of the disclosure. Reference frame 200 may correspond to content received from a server to be rendered on a client device, such as content received from media server 125 by client device 102 described with respect to FIG. 1. For example, reference frame 200 may correspond to pixels of a document or page to be rendered on a display of a client machine, such as client device 102.

Reference frame 200 illustrates a vertically scrolling scroll container 201 positioned in the reference frame 200. As shown in reference frame 200, scroll container 201 includes a plurality of cells, including cell-1 202a, cell 0 202b, cell n-1 202c, and cell n 202d, provided in one or more visible area 240 and/or invisible area 245 of scroll container 201. Visible area 240 may be referred to herein as the "visible window" and is the portion of the reference frame 200 that is rendered in the GUI. For purposes of explanation, reference frame 200 is depicted with inputs used to determine the relative threshold visibility percentage of cell n 202d. In one implementation, visibility component 107 described with respect to FIG. 1 may determine the relative threshold visibility percentage of cell n 202d.

In the example of FIG. 2, assume inputs to the process to determine relative threshold visibility percentages are such that ScrollView=scroll container 201, numSelected=2 (e.g., number of selected focus cells), and sortPriority='Top-to-bottom' (e.g., priority sort order). Reference frame 200 may further include the following values, as shown in FIG. 2. Scroll content offset (SCO) (dy) 210 denotes how far a visible area 240 of the scroll container 201 has scrolled (i.e. from the top of the reference frame 200). Cell 0 202b is determined to be leading "selected" cell or the furthermost selected cell from cell n 202d. In one implementation, cell 0 202b can be determined by the following: scrollView.getCellAtIndex (MAX (0, Cell_n.verticalIndex−numSelected)).

A visible height of cell n 202d is shown as vhtn 205d and may be determined as follows: VisibleHeight_Cell_n (vis_height_cn)=Cell_n.height*Cell_n.visibilityThreshold.

A visible height of cell 0 202*b* is shown as vht0 205*b* may be determined as follows: VisibleHeight_Cell_0 (vis_height_c0)=Cell_0.height*Cell_0.visibilityThreshold.

A minimum unfocused distance of cell n 202*d* is shown as mudn 206*d* and may be determined as follows: Min_unfocus_distance_Cell_n (min_udcn)=Cell_n.height–vis_height_cn. In one implementation, if cell n 202*d* is the top most visible cell, this is the minimum distance (from bottom to top) for cell n 202*d* to become unfocused (or deselected). A minimum unfocused distance of cell 0 202*b* is shown as mud0 206*b* and may be determined as follows: Min_unfocus_distance_Cell_0 (min_udc0)=Cell_0.height–vis_height_c0. If cell 0 202*b* is the top most visible cell, this is the minimum distance (from bottom to top) for cell 0 202*b* to become unfocused (or deselected).

The minimum focused distance of cell n 202*d* is shown as dtc 260 and may be determined as follows: Min_focused_distance_cell_n(min_fdcn)=MAX(min_udcn, min_udc0). The dtc 260 is the distance (from bottom to top) the cell n 202*d* has to travel to become selected.

The bottom cutoff threshold 280 is the bottom cut-off point for cell n 202*d* to become focused or selected if scrolling from the bottom of the reference frame 200 to the top of the reference frame 200. In some implementations, the bottom cutoff threshold 280 is the same as the focus threshold discussed above. The bottom cutoff threshold 280 may also be referred to as a threshold cutoff point in implementations of the disclosure. The distance to the bottom cutoff threshold 280 for cell n 202*d* is referred to as dbcn 207 and may be determined as follows: b_cutOff_n=dy+(Cell_n.y–Cell_0.y)–min_fdcn. The top cutoff threshold 290 is the top cut-off point for cell n 202*d* to become focused or selected if scrolling from the top of the reference frame 200 to the bottom of the reference frame 200. In some implementations, the top cutoff threshold 290 is the same as the focus threshold discussed above. The top cutoff threshold 290 may also be referred to as a threshold cutoff point in implementations of the disclosure. The distance to the top cutoff threshold 290 for cell n 202*d* may be determined as follows: t_cutOff_n=dy–min_udcn.

In one implementation, an example process (in pseudocode) to determine the vertical relative threshold visibility percentage of cell n 202*d* may be as follows:

```
float verticalRelativeVisibilityRatio;
float distanceToEdge;
float distanceToCutoff;
if ( Cell_ n .y >= b_cutOff_n ) { // cell is below b_cutOff_n
distanceToEdge = b_cutOff_n – dy;
distanceToCutoff = b_cutOff_n – Cell_ n .yt_origin.y;
verticalRelativeVisibilityRatio = ABS(distanceToEdge –
distanceToCutoff)/distanceToEdge;
} else if ( Cell_ n .y <= t_cutOff_n ) { // cell is above t_cutOff_n
distanceToEdge = dy ;
distanceToCutoff = Cell_ n .y – t_cutOff_n ;
verticalRelativeVisibilityRatio = ABS(distanceToEdge –
distanceToCutoff)/distanceToEdge;
} else { // cell is in selection range
verticalRelativeVisibilityRatio = 1.0;
}
return verticalRelativeVisibilityRatio * 100;
```

Figure 3:
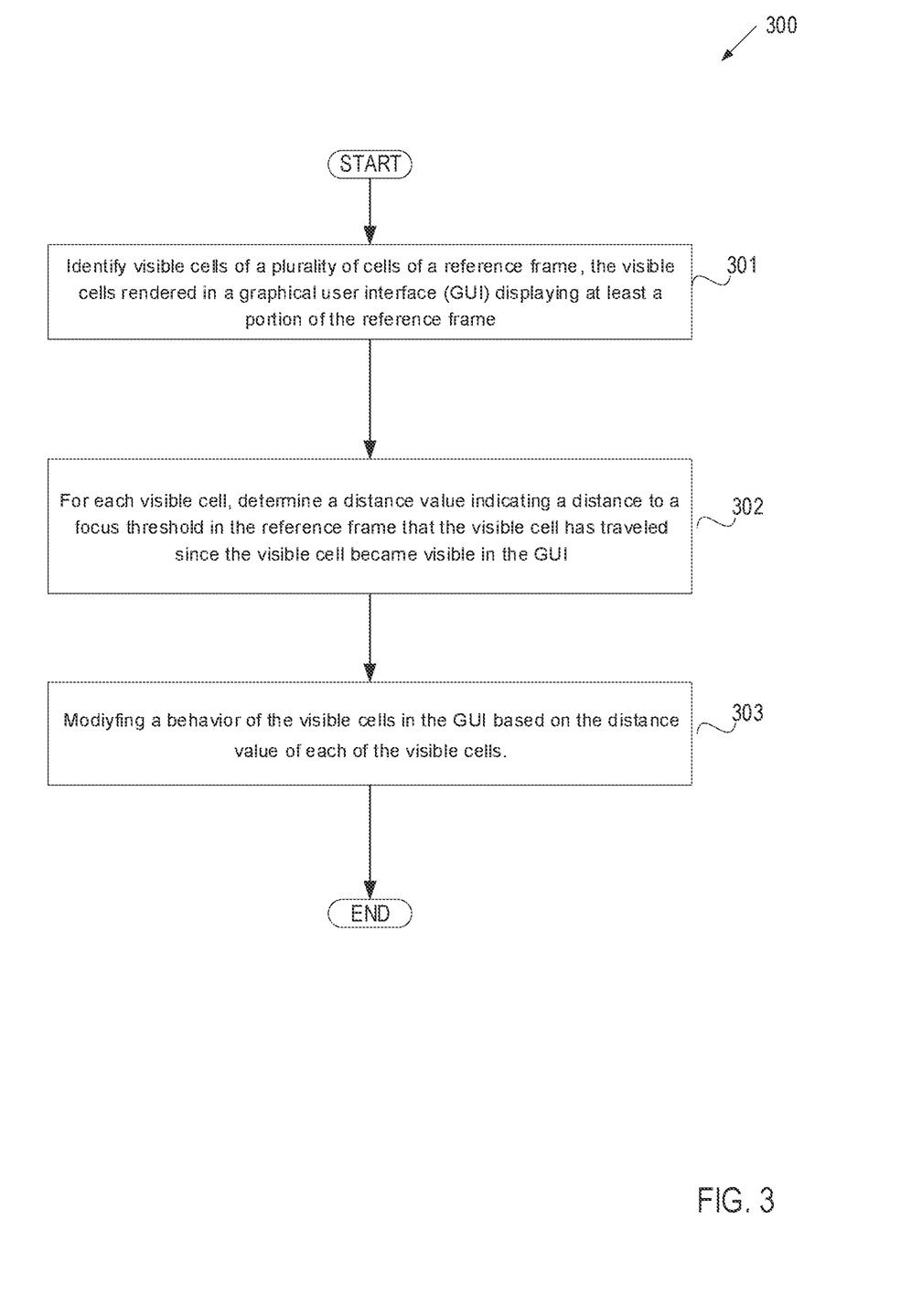
FIG. 3 depicts a flow diagram of one example of a method for determining a distance value of visible cells in a reference frame corresponding to a graphical user interface (GUI), in accordance with one or more aspects of the disclosure.

FIG. 3 depicts a flow diagram of one example of a method 300 for determining a distance value of visible cells in a reference frame corresponding to a GUI, in accordance with one or more aspects of the disclosure. The method is performed by processing logic that may comprise hardware (circuitry, dedicated logic, etc.), software (such as is run on a general purpose computer system or a dedicated machine), or a combination thereof. In one implementation, the method is performed by computer system 100 of FIG. 1, while in some other implementations, one or more blocks of FIG. 3 may be performed by one or more other machines not depicted in the figures. In some aspects, one or more blocks of FIG. 3 may be performed by visibility component 107 and/or cell behavior component 109 of client device 102 of FIG. 1.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Method 300 begins at block 301 with identifying visible cells of a plurality of cells of a reference frame, the visible cells rendered in a GUI displaying at least a portion of the reference frame The GUI may render a visible window of the reference frame that corresponds to received content. In one implementation, the visible cells refer to one or more cells of the reference frame having at least one pixel rendered in the GUI.

At block 302, for each visible cell of the visible cells, a distance value is determined. In one implementation, the distance value is the as the relative threshold visibility percentage discussed herein. The distance value can indicate a distance to a focus threshold in the reference frame that the visible cell has traveled since the visible cell became visible in the GUI. In one implementation, the focus threshold indicates a location in the reference frame that the visible cell is to become a focus cell in the GUI.

At block 303, a behavior of the visible cells in the GUI is modified based on the distance value of each of the visible cells. In one implementation, the behavior modification of the visible cells may include, but not limited to visibility threshold aware animation (e.g., color blending application to the visible cells), data prefetching (e.g., start a prefetching mechanism using relative threshold visibility percentage of an visible cell), or improving attention logging at a server device for the visible cells. In one implementation, the distance value for the visible cells of the reference frame (rendered in a GUI) is used to cause a particular cell behavior feature (e.g., color blending, data prefetching, etc.) to be applied to the visible cells according to the particular associated distance value of the cells.

Figure 4:
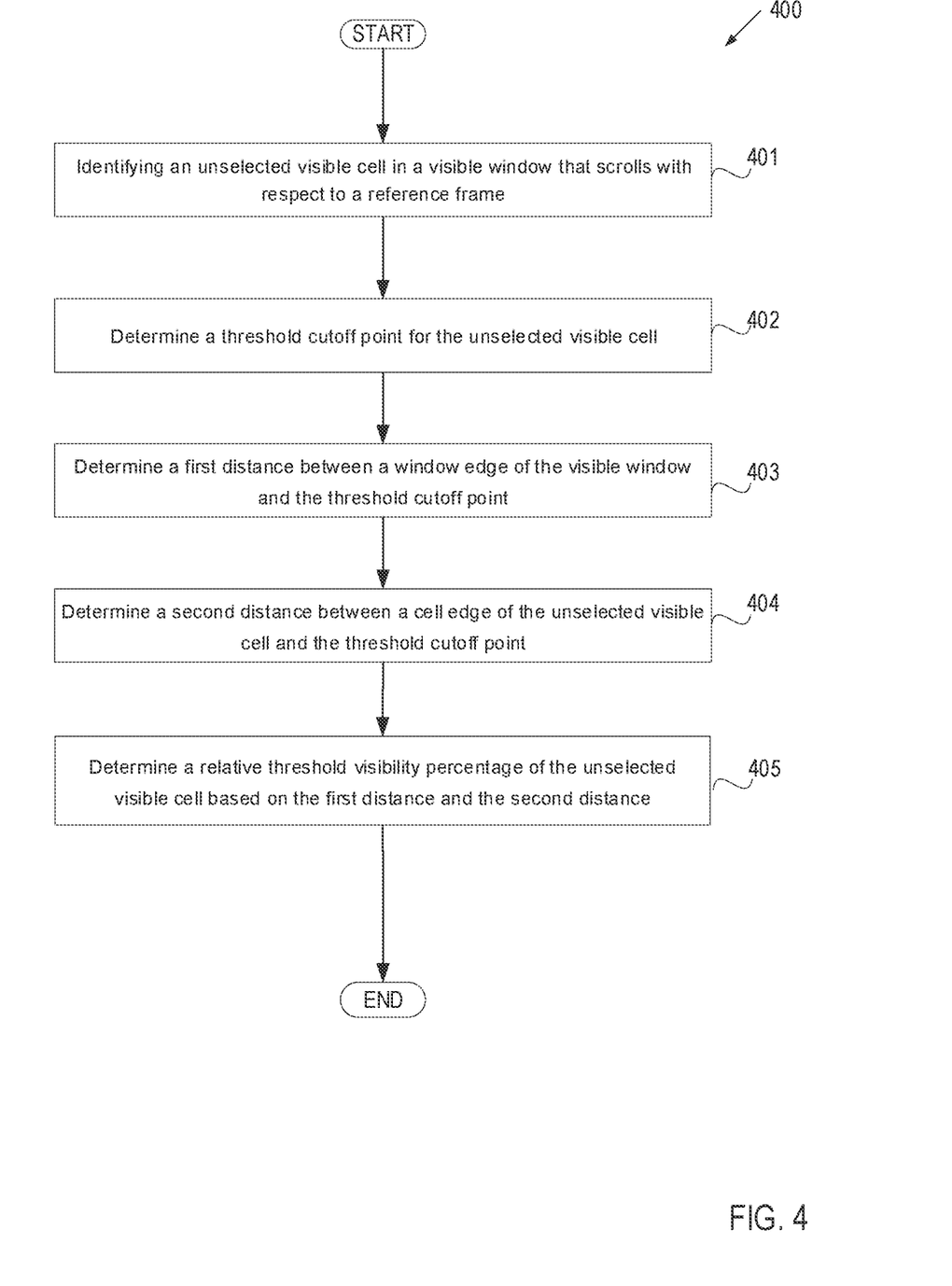
FIG. 4 depicts a flow diagram of one example of a method for determining relative threshold visibility percentages for cells of a reference frame, in accordance with one or more aspects of the disclosure.

FIG. 4 depicts a flow diagram of one example of a method 400 for determining relative threshold visibility percentages for cells of a reference frame, in accordance with one or more aspects of the disclosure. The method is performed by processing logic that may comprise hardware (circuitry, dedicated logic, etc.), software (such as is run on a general purpose computer system or a dedicated machine), or a combination thereof. In one implementation, the method is performed by computer system 100 of FIG. 1, while in some other implementations, one or more blocks of FIG. 4 may be performed by one or more other machines not depicted in the figures. In some aspects, one or more blocks of FIG. 4 may be performed by visibility component 107 of client device 102 of FIG. 1.

Method 400 begins at block 401 with identifying an unselected visible cell in a visible window that scrolls with respect to a reference frame. In one example, the visible window is the visible area 240 discussed with respect to FIG. 2. The unselected visible cell may refer to a visible cell in the reference frame that is not selected as a focus cell. In one implementation, the unselected visible cell is the same as cell n 202d described with respect to FIG. 2.

At block 402, a threshold cutoff point is determined for the unselected visible cell. In some implementations, the threshold cutoff point may be the same as the focus threshold discussed above, and may also refer to either the bottom cutoff threshold 280 or the top cutoff threshold 290 discussed with respect to FIG. 2. In one implementation, the threshold cutoff point is the point in the reference frame when, once reached by the unselected visible cell, the unselected visible cell becomes a focus cell.

At block 403, a first distance is determined between a window edge of the visible window and the threshold cutoff point. In one implementation, this first distance is the same as dte 270 described with respect to FIG. 2. At block 404, a second distance is determined between a cell edge of the unselected visible cell and the threshold cutoff point. In one implementation, this second distance is the same as dtc 260 described with respect to FIG. 2.

At block 405, a relative threshold visibility percentage of the unselected visible cell is determined based on the first distance and the second distance. In one implementation, the relative threshold visibility percentage may be the ratio of the value of first distance minus the second distance with respect to the first distance (e.g., (first distance−second distance)/first distance). Other combinations of the first and second distances may be utilized to determine the relative threshold visibility percentage in various implementations of the disclosure.

Figure 5:
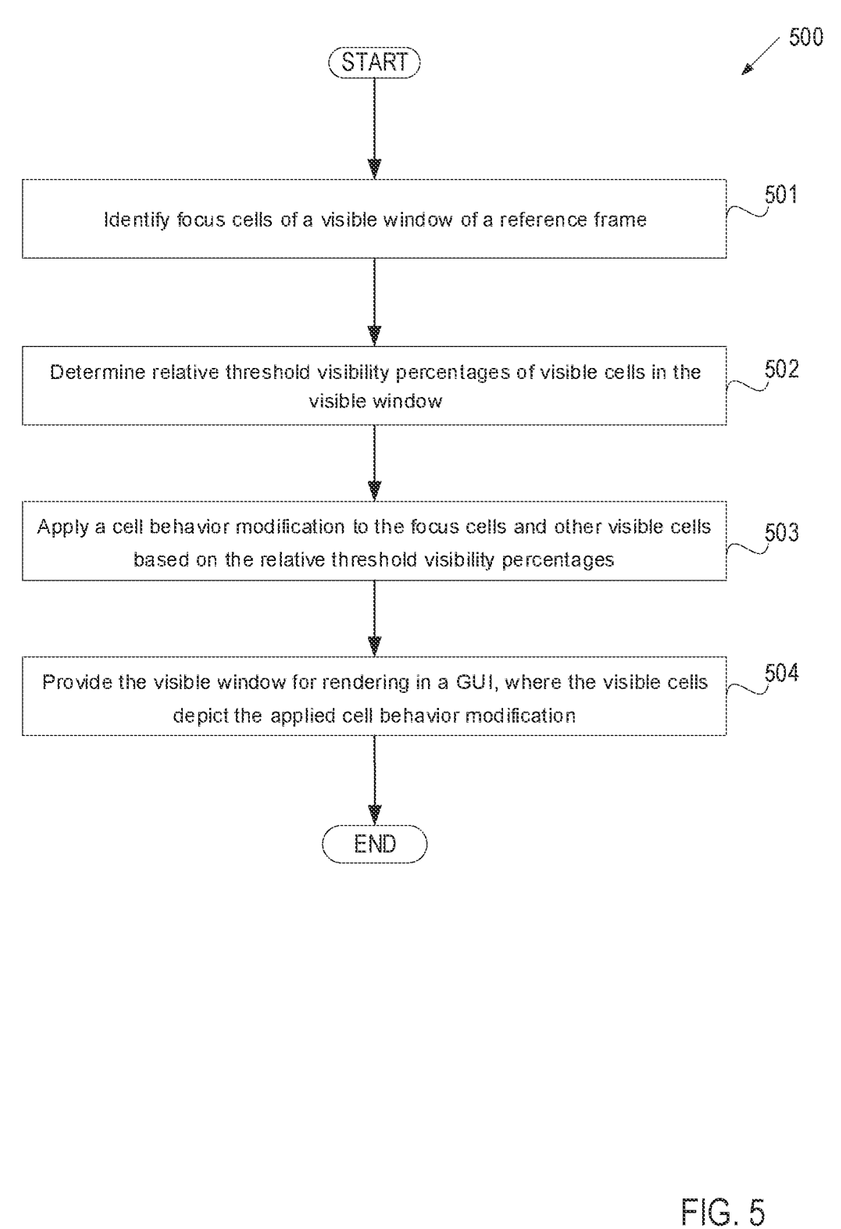
FIG. 5 depicts a flow diagram of one example of a method for applying relative threshold visibility percentages for cell behavior modifications of cells in a reference frame, in accordance with one or more aspects of the disclosure.

FIG. 5 depicts a flow diagram of one example of a method 500 for applying relative threshold visibility percentages for cell behavior modifications of cells in a reference frame, in accordance with one or more aspects of the disclosure. The method is performed by processing logic that may comprise hardware (circuitry, dedicated logic, etc.), software (such as is run on a general purpose computer system or a dedicated machine), or a combination thereof. In one implementation, the method is performed using visibility component 107 and/or cell behavior component 109 of client device 102 of FIG. 1.

Method 500 begins at block 501 with identifying focus cells of a visible window of a reference frame. In one implementation, the focus cells may refer to the visible cells most likely to be focused on (e.g., by a user) in a GUI rendering a portion of the reference frame including a plurality of cells.

At block 502, a relative threshold visibility percentage is determined for each of the visible cells in the visible window. The relative threshold visibility percentage may refer to a proportion of a distance to a focus threshold in the reference frame that the visible cell has traveled since the visible cell became visible in the visible window. In one implementation, the focus threshold indicates a location in the reference frame that the visible cell is to become a focus cell in the GUI.

At block 503, a cell behavior modification is applied to the focus cells and to the other visible cells based on the relative threshold visibility percentages. In one implementation, the cell behavior modification may include visibility threshold aware animation (e.g., color blending application to the unselected visible cells), data prefetching (e.g., start a pre-fetching mechanism using the relative threshold visibility percentages), or improving attention logging with respect to the cells.

Lastly, at block 504, the visible window is provided for rendering in a GUI. In one implementation, the visible cells depict the cell behavior modification applied at block 503.

Figure 6:
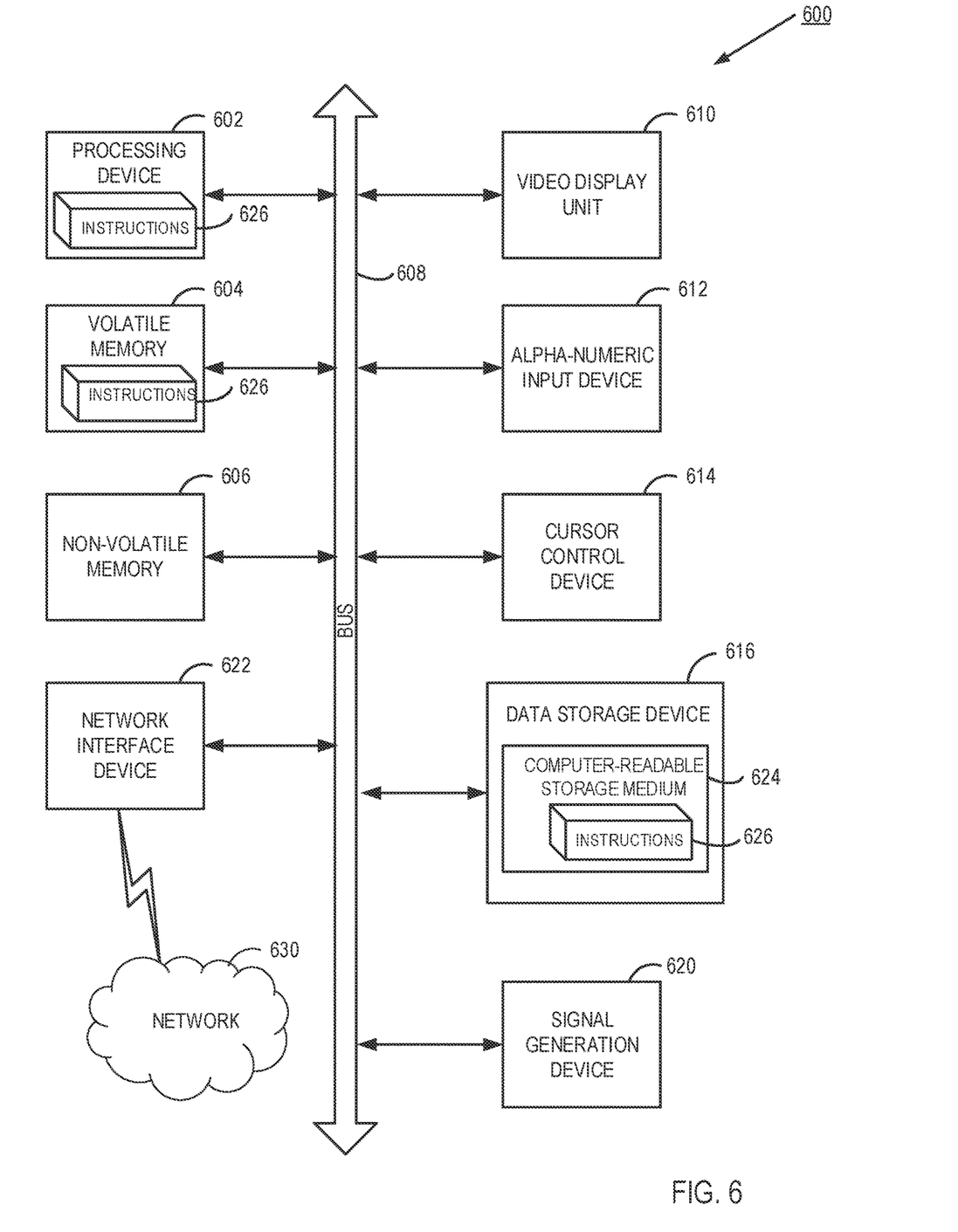
FIG. 6 depicts a block diagram of an illustrative computer system operating in accordance with one or more aspects of the disclosure.

FIG. 6 depicts a block diagram of an illustrative computer system 600 operating in accordance with one or more aspects of the disclosure. In various illustrative examples, computer system 600 may correspond to a computing device within system architecture 100 of FIG. 1. In certain implementations, computer system 600 may be connected (e.g., via a network 630, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300-500 of FIGS. 3 through 5, respectively.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by component modules or functional circuitry within hardware devices. Further, the methods, components, and features may be implemented in any combination of hardware devices and computer program components, or in computer programs.

Unless specifically stated otherwise, terms such as "generating," "providing," "training," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 through 500 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    identifying a visible portion of a graphical user interface (GUI), wherein the visible portion of the GUI includes a plurality of cells;
    determining, by a processing device, a plurality of distance values, wherein each distance value of the plurality of distances values indicates a distance to a focus threshold in the GUI that a cell of the plurality of cells of the visible portion of the GUI has traveled since the visible portion became visible in the GUI, wherein the distance value comprises a relative threshold visibility value; and
    modifying a behavior of the visible portion of the GUI based on the distance value of each of the plurality of cells.

2. The method of claim 1, wherein the focus threshold indicates a location in the GUI that the cell of the plurality of cells of the visible portion becomes a focus cell in the GUI.

3. The method of claim 2, further comprising determining the relative threshold visibility value by:
    identifying an unselected cell of the plurality of cells of the visible portion visible in a visible portion of the GUI;
    determining a threshold cutoff point for the unselected cell;
    determining a first distance between a window edge of the visible portion and the threshold cutoff point;
    determining a second distance between a cell edge of the unselected cell and the threshold cutoff point; and
    determining the relative threshold visibility value of the unselected cell based on the first distance and the second distance.

4. The method of claim 2, wherein the focus cells comprises the plurality of cells of the visible portion most likely to be focused on in the GUI, and wherein a different cell behavior is applied to the plurality of cells of the visible portion in response to identification as one of the focus cells.

5. The method of claim 1, wherein the plurality of cells of the visible portion comprise one or more cells of the GUI having at least one pixel rendered in the GUI.

6. The method of claim 1, wherein the GUI corresponds to a visible window within a scrolling container of the GUI, wherein the scrolling container comprises a set of the plurality of cells that can scroll at least one of horizontally or vertically within the scrolling container, and wherein at least a portion of the plurality of cells of the visible portion are in the visible window.

7. The method of claim 1, wherein the plurality of cells each comprise a logically separate section of the GUI.

8. The method of claim 1, further comprising:
    identifying the plurality of cells of the visible portion that have an absolute visibility percentage that exceeds a threshold visibility percentage;
    selecting a determined number of the identified cells of the plurality of cells of the visible portion as focus cells based on a number of the focus cells designated for the GUI;
    ordering the identified cells into ordered plurality of cells of the visible portion according to a priority sort order;
    selecting the determined number of the ordered plurality of cells that are ordered highest as the focus cells; and
    returning identification of the focus cells and the distance values of each of the plurality of cells of the visible portion;
    wherein the priority sort order is based on at least one of a top-to-bottom direction, a bottom-to-top direction, a left-to-right direction, or a right-to-left direction.

9. The method of claim 1, wherein modifying the behavior comprises applying the distance value to the plurality of cells of the visible portion to provide a color blending effect in the plurality of cells of the visible portion in accordance with a particular value of the plurality of distance values.

10. The method of claim 1, wherein modifying the behavior comprises performing data prefetching of the plurality of cells of the visible portion based on the plurality of distance values.

11. The method of claim 1, wherein the distance value is provided to a server device for data logging corresponding to the plurality of cells of the visible portion.

12. An apparatus comprising:
a memory;
a display device to render a graphical user interface (GUI); and
a processing device, operatively coupled to the memory and the display device, to:
identify a visible portion of a graphical user interface (GUI), wherein the visible portion of the GUI includes a plurality of cells;
determine, by the processing device, a plurality of distance values, wherein each distance value of the plurality of distances values indicates a distance to a focus threshold in the GUI that a cell of the plurality of cells of the visible portion of the GUI has traveled since the visible portion became visible in the GUI, wherein the distance value comprises a relative threshold visibility value; and
modify a behavior of the visible portion of the GUI based on the distance value of each of the plurality of cells.

13. The apparatus of claim 12, wherein the focus threshold indicates a location in the GUI that the cell of the plurality of cells of the visible portion becomes a focus cell in the GUI.

14. The apparatus of claim 13, wherein the processing device is further to determine the relative threshold visibility value by:
identifying an unselected cell of the plurality of cells of the visible portion visible in a visible window of the GUI;
determining a threshold cutoff point for the unselected cell;
determining a first distance between a window edge of the visible window and the threshold cutoff point;
determining a second distance between a cell edge of the unselected cell and the threshold cutoff point; and
determining the relative threshold visibility value of the unselected cell based on the first distance and the second distance.

15. The apparatus of claim 13, wherein the focus cells comprises the plurality of cells of the visible portion most likely to be focused on in the GUI, and wherein a different cell behavior is applied to the plurality of cells of the visible portion in response to identification as one of the focus cells.

16. The apparatus of claim 12, wherein the plurality of cells of the visible portion comprise one or more cells of the GUI having at least one pixel rendered in the GUI.

17. The apparatus of claim 12, wherein the GUI corresponds to a visible window within a scrolling container of the GUI, wherein the scrolling container comprises a set of the plurality of cells that can scroll at least one of horizontally or vertically within the scrolling container, and wherein at least a portion of the plurality of cells of the visible portion are in the visible window.

18. A non-transitory machine-readable storage medium storing instructions which, when executed, cause a processing device to perform operations comprising:
identifying a visible portion of a graphical user interface (GUI), wherein the visible portion of the GUI includes a plurality of cells;
determining, by a processing device, a plurality of distance values, wherein each distance value of the plurality of distances values indicates a distance to a focus threshold in the GUI that a cell of the plurality of cells of the visible portion of the GUI has traveled since the visible portion became visible in the GUI, wherein the distance value comprises a relative threshold visibility value; and
modifying a behavior of the visible portion of the GUI based on the distance value of each of the plurality of cells.

19. The non-transitory machine-readable storage medium of claim 18, wherein modifying the behavior comprises applying the distance value to the plurality of cells of the visible portion to provide a color blending effect in the plurality of cells of the visible portion in accordance with a particular value of the plurality of distance values.

20. The non-transitory machine-readable storage medium of claim 18, wherein modifying the behavior comprises performing data prefetching of the plurality of cells of the visible portion based on the plurality of distance values.

* * * * *